US012797863B2

(12) United States Patent
Hamm

(10) Patent No.: US 12,797,863 B2
(45) Date of Patent: Nov. 17, 2026

(54) BIOELECTRIC METHOD FOR ENHANCEMENT OF CATION UPTAKE IN VASCULAR PLANTS

(71) Applicants: Plantrodics, LLC, Akron,, OH (US); Barbara McFarland, Tamarac, FL (US)

(72) Inventor: Richard Roy Hamm, Akron, OH (US)

(73) Assignee: Plantrodics, LLC, Akron, OH (US)

( * ) Notice: Subject to any disclaimer, the term of this patent is extended or adjusted under 35 U.S.C. 154(b) by 336 days.

(21) Appl. No.: 18/679,686

(22) Filed: May 31, 2024

(65) Prior Publication Data

US 2024/0316572 A1 Sep. 26, 2024

Related U.S. Application Data

(60) Provisional application No. 63/470,861, filed on Jun. 3, 2023.

(51) Int. Cl.

*A01G 7/04* (2006.01)
*B03C 3/017* (2006.01)
*B03C 3/38* (2006.01)
*B03C 3/68* (2006.01)

(52) U.S. Cl.

CPC .................. *B03C 3/68* (2013.01); *A01G 7/04* (2013.01); *B03C 3/017* (2013.01); *B03C 3/38* (2013.01)

(58) Field of Classification Search

None

See application file for complete search history.

(56) References Cited

U.S. PATENT DOCUMENTS

| | | | | |
|---|---|---|---|---|
| 1,952,588 A * | 3/1934 | Golden | A61N 1/10 | 256/10 |
| 3,120,722 A * | 2/1964 | Keller | A01G 7/04 | 47/1.3 |
| 3,876,907 A * | 4/1975 | Widmayer | H05B 41/39 | 47/DIG. 6 |
| 5,077,934 A * | 1/1992 | Liboff | A01G 7/04 | 47/1.3 |

(Continued)

FOREIGN PATENT DOCUMENTS

| | | | |
|---|---|---|---|
| AT | 410158 B * | 2/2003 | A01G 7/04 |
| CN | 105594574 A * | 5/2016 | A61L 2/18 |

(Continued)

*Primary Examiner* — Morgan T Jordan

(74) *Attorney, Agent, or Firm* — The Powers IP Law Firm

(57) ABSTRACT

A bioelectric method is for optimizing an ionomic content of a vascular plant. The method includes providing an electrode and an insulator located on the electrode in order to prevent creation of an ion wind around the electrode; electrically connecting the electrode to a voltage power supply; providing an electrical pathway from a return side of the voltage power supply to roots of the vascular plant, the electrical pathway including a substrate between the roots and the electrode; charging the electrode to a voltage via a varying voltage output of the voltage power supply, thereby generating an electric field emanating from the electrode; and terminating the electric field on surfaces of leaves of the plant for optimizing the ionomic content such that mineral cations are taken up by the plant from nutrients in the substrate and into symplastic material of the leaves.

20 Claims, 9 Drawing Sheets

(56) References Cited

U.S. PATENT DOCUMENTS

| | | | | | |
|---|---|---|---|---|---|
| 5,464,456 | A * | 11/1995 | Kertz | A47G 7/02 | 47/60 |
| 6,202,479 | B1 * | 3/2001 | Frybarger | G01N 33/246 | 73/304 C |
| 7,956,624 | B2 * | 6/2011 | Beaulieu | G01N 33/246 | 324/692 |
| 8,289,035 | B1 * | 10/2012 | Gensler | G01N 27/22 | 324/692 |
| 9,719,952 | B1 * | 8/2017 | Gensler | G01N 33/188 | |
| 10,757,869 | B1 * | 9/2020 | Yost | A01G 9/26 | |
| 12,245,558 | B2 * | 3/2025 | Yadlapalli | A01G 7/04 | |
| 12,399,149 | B2 * | 8/2025 | Zamanzadeh | G01N 27/4168 | |
| 12,433,203 | B2 * | 10/2025 | Singer | B05B 5/1608 | |
| 12,501,863 | B2 * | 12/2025 | Li | A01G 7/04 | |
| 2011/0096454 | A1 * | 4/2011 | Corsi | A01G 7/04 | 361/212 |
| 2011/0162526 | A1 * | 7/2011 | Tatsumi | B03C 3/08 | 47/20.1 |
| 2016/0198637 | A1 * | 7/2016 | Mirzakhani Nafchi | A01G 7/04 | 47/1.3 |
| 2017/0013794 | A1 * | 1/2017 | Tinsley | A01G 9/12 | |
| 2017/0332544 | A1 * | 11/2017 | Conrad | G06N 20/00 | |
| 2018/0054986 | A1 * | 3/2018 | Fu | A01G 31/04 | |
| 2018/0213735 | A1 * | 8/2018 | Vail | A01G 7/045 | |
| 2019/0203238 | A1 * | 7/2019 | Chen | A01H 3/02 | |
| 2020/0288652 | A1 * | 9/2020 | Yoshikawa | A01G 25/00 | |
| 2022/0047881 | A1 * | 2/2022 | Delphini | A61N 1/10 | |
| 2022/0087112 | A1 * | 3/2022 | Szabo | A01G 7/045 | |
| 2022/0087116 | A1 * | 3/2022 | Hunter | A01G 27/006 | |
| 2022/0117176 | A1 * | 4/2022 | Gennaro | A01G 27/006 | |
| 2022/0287245 | A1 * | 9/2022 | Cordova | A01G 7/04 | |
| 2023/0028378 | A1 * | 1/2023 | Stephen | A01G 7/04 | |
| 2023/0157217 | A1 * | 5/2023 | Doyle | A01G 7/045 | 47/58.1 LS |
| 2023/0200309 | A1 * | 6/2023 | Kim | A01G 7/02 | 47/58.1 R |
| 2023/0329154 | A1 * | 10/2023 | Zamanzadeh | A01G 7/04 | |
| 2024/0023491 | A1 * | 1/2024 | Yadlapalli | A01G 7/04 | |
| 2024/0057536 | A1 * | 2/2024 | Singer | A01G 7/04 | |
| 2025/0351780 | A1 * | 11/2025 | Zamanzadeh | A01G 7/04 | |

FOREIGN PATENT DOCUMENTS

| | | | | | |
|---|---|---|---|---|---|
| CN | 107388348 | A | * | 11/2017 | F24F 8/175 |
| CN | 107455159 | A | * | 12/2017 | A01G 7/04 |
| CN | 107996182 | A | * | 5/2018 | A01G 7/045 |
| CN | 112930919 | A | * | 6/2021 | H02M 11/00 |
| DE | 102020205323 | A1 | * | 10/2021 | A01G 27/00 |
| FR | 2601226 | A1 | * | 1/1988 | A01G 7/00 |
| FR | 2642265 | A1 | * | 8/1990 | A01G 7/04 |
| FR | 2642267 | A1 | * | 8/1990 | A01G 7/04 |
| FR | 2814332 | A1 | * | 3/2002 | A01G 31/00 |
| GB | 2579772 | A | * | 7/2020 | A01G 7/04 |
| GB | 2605826 | A | * | 10/2022 | A01G 24/60 |
| JP | 2003070405 | A | * | 3/2003 | A01M 1/223 |
| KR | 20160031738 | A | * | 3/2016 | A01G 7/045 |
| KR | 20180054120 | A | * | 5/2018 | A01G 7/04 |
| KR | 20220143375 | A | * | 10/2022 | B03C 3/45 |
| KR | 20220144261 | A | * | 10/2022 | A01G 27/008 |
| KR | 20260040869 | A | * | 3/2026 | A01G 9/14 |
| RU | 2749427 | C1 | * | 6/2021 | A01G 7/04 |
| WO | WO-2014084516 | A1 | * | 6/2014 | A01G 31/00 |
| WO | WO-2020081525 | A1 | * | 4/2020 | A01G 7/04 |
| WO | WO-2020152133 | A1 | * | 7/2020 | A01G 7/045 |

* cited by examiner

300

Table

Analysis Report (Job #2280, 8/5/2022) from University of Maine Analytical Laboratory, Maine Soil Testing Service for Each Group of Lettuce Plants, The Null Group, #232 (No Voltage Field Imposed During Growth) and the Negative Electric Field Group, #121. Total Dry Weight: #121: 7.291 Grams, #232: 5.462 grams. Note Dry Weight Increase of Approximately 30 percent in the Negative Electric Field Group

| Element | Name | Units | #121 | #232 |
|---|---|---|---|---|
| TN | Total Nitrogen | Percent of Dry Weight | 3.93 | 4.25 |
| Ca | Calcium | Percent of Dry Weight | 0.584 | 0.528 |
| K | Potassium | Percent of Dry Weight | 5.68 | 5.81 |
| Mg | Magnesium | Percent of Dry Weight | 0.288 | 0.256 |
| P | Phosphorus | Percent of Dry Weight | 0.586 | 0.593 |
| Al | Aluminum | Parts Per Million | 121 | 74.8 |
| B | Boron | Parts Per Million | 58.8 | 49.3 |
| Cu | Copper | Parts Per Million | 20.3 | 13.8 |
| Fe | Iron | Parts Per Million | 235 | 134 |
| Mn | Manganese | Parts Per Million | 99.7 | 91.6 |
| Zn | Zinc | Parts Per Million | 108.1 | 66.0 |
| S | Sulfur | Parts Per Million | 2852 | 2765 |

FIG. 8

BIOELECTRIC METHOD FOR ENHANCEMENT OF CATION UPTAKE IN VASCULAR PLANTS

CROSS REFERENCE TO RELATED APPLICATION

This application claims priority to and claims the benefit of U.S. Provisional Application Ser. No. 63/470,861, filed Jun. 3, 2023, the contents of which are incorporated herein by reference in their entirety.

FIELD OF THE INVENTION

The disclosed method is related to increasing an ionomic content in a vascular plant.

BACKGROUND ART

Since the beginning of the Industrial Revolution, steady reduction of macro- and micronutrient concentration in plants continues to pose an existential threat to all living things on the surface of the earth and has been shown to be directly related to increasing concentration of carbon dioxide, $CO_2$, in the atmosphere. Hidden hunger is the term applied to human malnutrition effects due to macro- and micronutrient deficiency in plant sourced food. Human development, growth, and health are dependent on nutrition and calories derived from plant sourced food including animal products. Depletion of plant nutrient content also impacts herbivore nutrition, ranging from insects to elephants. Despite sufficient caloric content of crop and animal food sources, hidden hunger threatens human health. Plant mineral nutrient and trace element composition (ionome) and concentrations, particularly iron, zinc, and magnesium are important not only for plant metabolism and growth, but play critical roles in human health. Plant macronutrient, magnesium, plays a critical role as an activator of Ribulose 1,5-Bisphosphate Carboxylase-Oxygenase, RuBisCo, enzymes essential for photosynthetic $CO_2$ fixation. Magnesium is located at the core of chlorophyll molecules, thus performing a critical role in plant photosynthesis processes. Also, Rubisco is found in all plants and contains phosphor, another macronutrient, in its molecular structure. Strategies to regulate bioavailable plant ionomic concentrations in the human diet include dietary supplements and biofortification. Dietary supplements are costly for the majority of humanity and are not always as well absorbed by the body as biofortified food nutrient content.

Biofortification and biological fortification refer to nutritionally enhanced food crops with increased bioavailability to the human population, which are developed and grown using modern biotechnology techniques, conventional plant breeding, and agronomic practices. Four techniques constitute the bulk of modern biofortification practices which are agronomic, conventional plant breeding, nanoencapsulation, and genetic modification. Enhancing delivery of macro- and micronutrients and trace elements to undernourished human and animal populations is the challenge of biofortification technology.

Biofortification falls within the agronomic categories of soil, plant science, and fertilizer (plant nutrient) requirements and application. Minerals such as magnesium and iron along with over a dozen other elemental minerals are typically absorbed by plants through the soil. Crops rely upon regular application of fertilizer to soil, augmenting mineral deficiencies underlying crop yield and edible plant tissue ionomic content. Foliar application of liquid nutrients can overcome problems related to poor soil conditions affecting mineral nutrient uptake efficiency due to insolubility of some soil sourced nutrients, ferric oxide for example. Another agronomic strategy is the application of plant growth-enhancing soil micro-organisms. These organisms can improve plant uptake efficiency of nutrients.

While agronomic biofortification is a historically proven and successful strategy, limitations include highly variable soil differences affecting mineral uptake efficiency, vagaries of weather, comparative cost effectiveness, variable labor and equipment requirements, and environmental consequences of fertilizer accumulation in soil and water run-off.

Plant breeding is a conventional and successful method of biofortification. Basically, two genotypical related plants each with separate but desirable traits (i.e., one cultivar exhibits high yield and the other has higher vitamin A content) are crossbred to produce a new plant cultivar possessing both desirable traits, a plant with high vitamin A content and an excellent agronomic trait (i.e., yield). Plant mutation breeding is another strategy to create plant cultivars with desirable traits. If genetic diversity of a target crop specie is limited or unavailable, then a genetic transformation, genetic modification, may be useful. Conventional plant breeding strategies however successful have limitations such as small numbers of genetic variations from which to select a cross breed candidate, difficult inheritability traits, and linkage drag which is the appearance of undesirable traits in the new cultivar.

Nanoencapsulation is a relatively new technology involving mesoporous aluminosilicate material which exhibits amorphous pore walls allowing active sites for ion exchange and adsorption of macro- and micronutrient elements all of which are encapsulated in a nanocoating. Engineered nanosized capsule can survive environmental stress factors like soil pH, light and oxidants, among others to deliver its nutrient cargo to plant roots and the engineered coating facilitating absorption, uptake, and bioavailability. Foliar application of nanofertilizers is a promising recent development. Nanofertilizer use is considered a sustainable and cost-effective method to augment soil fertility. Overuse of nanofertilizers is reported to be toxic to plants, animals, and soil microorganisms.

Plant mutagenesis can occur naturally (i.e., exposure to environmental stress or cosmic radiation) without human intervention, but thousands of useful plant mutations are also produced employing radiation to modify plant DNA, deoxyribonucleic acid. Transgenic engineered plant DNA differs from plant mutation breeding. Transgenic engineering involves the physical modification of plant DNA by insertion of new genetic material in plant tissue culture. Subsequent plant growth from modified tissue culture yields seeds which carry the modified DNA. Transgenic engineering approach to improving plant metabolism, nutrient concentration, nutrient bioavailability, among other internal plant support processes can be likened to a Swiss army knife. Genetic choices are available from an almost unlimited genetic pool of all plant species. Plant genetic engineering is not limited by source taxonomy. Synthetic genes could also be employed to achieve a desired trait or metabolic result. Although considerable investment of time and resources is required during the early development stage, the long-term benefits can far outweigh initial costs. Despite potential benefits, transgenic crop acceptance by consumers, farmers, and governmental regulatory agencies limits the implementation of this biofortification strategy.

Plant growth is directly dependent upon transpiration. Carbon dioxide in the atmosphere around the plant is taken into the plant leaves through stomatal openings in the epidermal surfaces of leaves. Photosynthesis within leaf cells converts $CO_2$ into carbohydrates and oxygen among other carbon rich components supporting plant growth. The oxygen byproduct is returned to the atmosphere along with water vapor through the same stomatal openings. As water vapor passes into the atmosphere around the plant, relative humidity increases and plant transpiration rate decreases unless excess water vapor is reduced from areas around plant leaves or canopy. Water vapor expelled from stomata has to pass through the boundary layer, a layer of air next to the leaf surfaces, then onto the surrounding bulk air. The rate of water vapor diffusion out of leaf stomata depends in part on the density gradient of the boundary layer.

The present invention augments and enhances all existing plant biofortification strategies.

SUMMARY

In one aspect of the disclosed method, a bioelectric method for optimizing an ionomic content of a vascular plant is provided. The method comprises providing an electrode and an insulator located on the electrode in order to prevent creation of an ion wind around the electrode; electrically connecting the electrode to a voltage power supply; providing an electrical pathway from a return side of the voltage power supply to roots of the vascular plant, the electrical pathway comprising a substrate disposed between the roots and the electrode; charging the electrode to a voltage via a varying voltage output of the voltage power supply, thereby generating an electric field emanating from the electrode; and terminating the electric field on surfaces of leaves of the vascular plant for optimizing the ionomic content such that mineral cations are taken up by the vascular plant from nutrients in the substrate and into symplastic material of the leaves.

In another aspect, a bioelectric method comprises providing an electrode; electrically connecting the electrode to a voltage power supply; providing an electrical pathway from a return side of the voltage power supply to roots of a vascular plant, the electrical pathway comprising a substrate disposed between the roots and the electrode; charging the electrode to a voltage via a voltage output of the voltage power supply, thereby generating an electric field emanating from the electrode; actively superimposing a dither waveform onto a signal of the voltage in order to vary a level of the voltage, thus varying the electric field; and terminating the electric field on the vascular plant.

In further aspect, a bioelectric method for optimizing an ionomic content of a vascular plant is provided. The method comprises providing an insulator and an electrode disposed within the insulator; coupling the insulator to an apparatus; electrically connecting the electrode to a voltage power supply; providing an electrical pathway from a return side of the voltage power supply to roots of a vascular plant, the electrical pathway comprising a substrate disposed between the roots and the electrode; charging the electrode to a voltage via a voltage output of the voltage power supply, thereby generating an electric field emanating from the electrode; terminating the electric field on the vascular plant; and moving the insulator and the electrode transversely with respect to the sessile vascular plant with the apparatus in order to directly cause a strength of the electric field with respect to the vascular plant to vary.

Further objects, features, and advantages of the present invention over the prior art will become apparent from the detailed description of the drawings which follows, when considered with the attached figures.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 8 shows an elemental analysis report data for a vascular plant experiment, labelled LETTUCE 5, where the control group of vascular plants was grown under zero electric field conditions, and the second lettuce group was grown under slowly varying negative electric field conditions.

DETAILED DESCRIPTION OF THE PREFERRED EMBODIMENT

Figure 1:
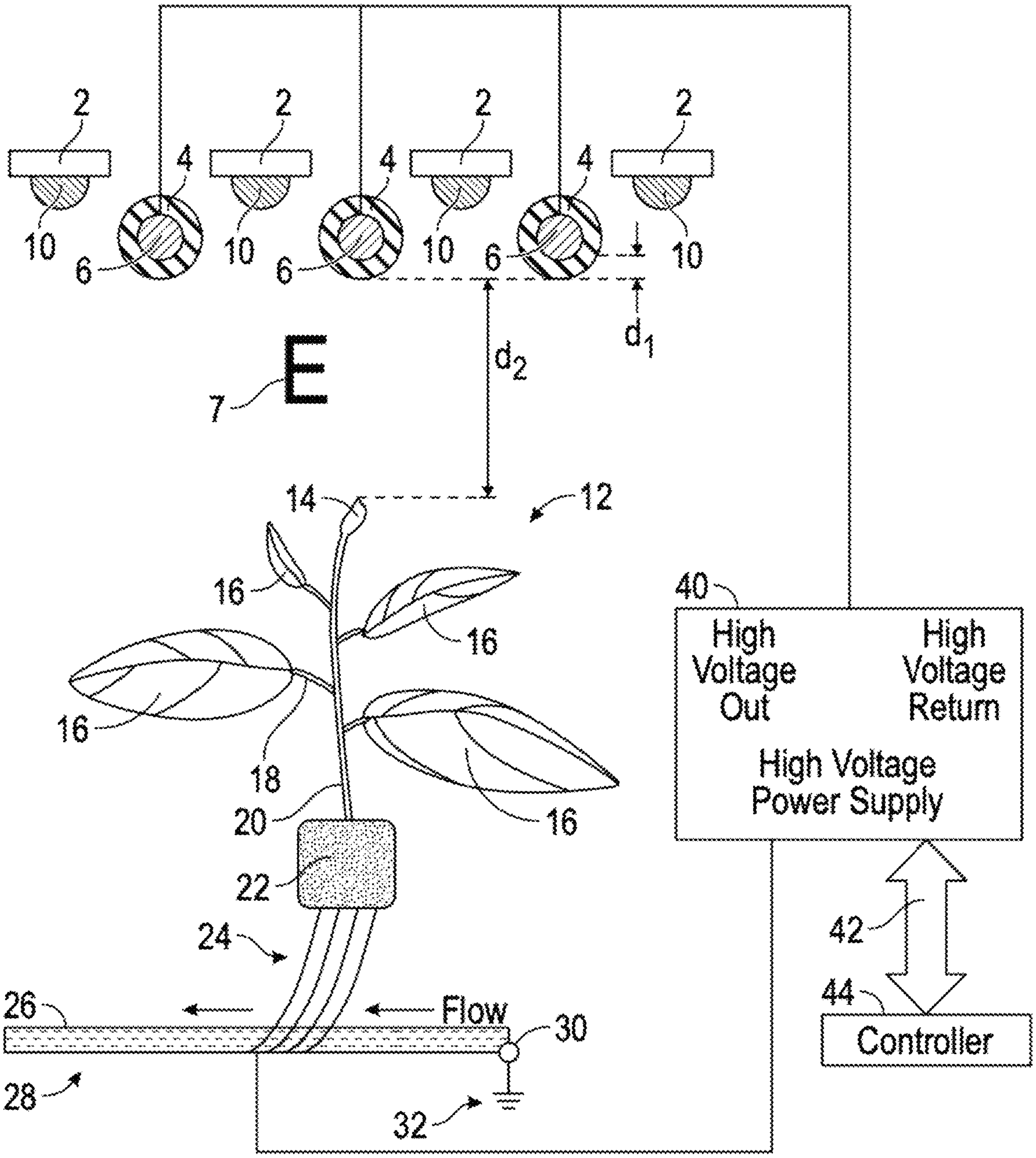
FIG. 1 is a simplified basic diagram of a system, in accordance with one non-limiting embodiment of the disclosed method.

As employed herein, the word "coupled" shall mean connected together either directly or via one or more intermediate parts or components.

As employed herein, the term "number" shall mean one or an integer greater than one (i.e., a plurality).

As employed herein, the term "homeostatic process driving levels" shall mean properties of a vascular plant configured to keep the vascular plant in ionomic balance.

As employed herein, the term "symplastic material" shall mean an inner portion of a plant which is bounded by plasma membranes. Symplastic material preferably contains a network of cytoplasm of plant cells which are interconnected by plasmodesmata. Symplastic material in accordance with the disclosed method may be a living part of plant tissue without the presence of a cell wall and intercellular spaces.

As employed herein, the term "substrate" shall mean a substance configured to anchor a plant and to provide nutrients to roots of a plant. Non-limiting examples of substrates in accordance with the disclosed method include soil, peat plugs in which seeds are planted and from which plants initially take root, nutrient film systems in hydroponic applications, along with mechanical structures for stabilizing a plant and allowing roots to grow into a nutrient film flowing beneath a growing plant.

As employed herein, the terms "adaxial" and "abaxial" shall mean upper and lower sides, respectively, of a plant leaf with respect to a ground. The adaxial side of a leaf cuticle is typically relatively thick and faces light sources since just below the adaxial or upper surface of the leaf are cells which photosynthesize light, water, and carbon dioxide to create food for itself. Stomatal openings on the abaxial or lower surface of the leaf provide access to carbon dioxide for photosynthesis and expel oxygen and water vapor created by the photosynthesis process to the bulk air surrounding the plant.

As employed herein, the phrase "dither waveform" shall mean a waveform that is electrically superimposed on a larger main waveform. Dither waveforms in accordance with the disclosed method preferably should not exceed a voltage level which when superimposed on the main waveform causes the main waveform to rail (e.g., when the combination of the dither signal and the main waveform signal exceeds a specified maximum voltage output of a main waveform voltage generator).

As employed herein, the phrase "conformally coats" shall mean conforms to a landscape of an object in order to provide increased dielectric resistance. An insulator "conformally coats" an electrode when the insulator is located on an exterior of the electrode, and presents in the form of a film which has an interior surface or surfaces shaped substantially or entirely the same as an exterior surface or surfaces of the electrode.

As employed herein, the term "optimize" shall mean increase an uptake efficiency of a vascular plant so that minerals may be better taken up by the vascular plant via its roots.

Methods in accordance with the disclosed method, including bioelectric methods such as electro-biofortification methods, are configured to optimize uptake of elemental nutrients in the form of cations, which are useful for plant growth and human and animal consumption. The disclosed method and system can augment and amplify any existing biofortification strategy. Sufficient plant growth environment and bioavailable nutrients required by plants along with a system to generate and impose and control non-ionizing electric fields on the plants are preferred conditions necessary to achieve enhanced nutrient benefits offered by the disclosed method.

A significant factor missing from prior electro-culture studies involving ionizing high voltage electric fields imposed on plants is any consideration of the effects of ion wind also known as corona wind on experimental plant populations.

A thinner boundary layer poses less resistance to the movement of water vapor from leaf stomata to bulk air. Air movement, i.e., wind, makes the vapor barrier thinner, thus reducing water vapor concentration around the plant increases the rate of plant transpiration resulting in increased plant growth rate and higher yield. High voltage charged uninsulated electrodes may ionize air molecules surrounding the electrodes. The creation of a continuous ionic wind exists as long as uninsulated electrodes are charged by a high voltage. Ionic wind generated by electrodes near plants will impinge on plant leaves reducing relative humidity and water vapor density thus increasing plant transpiration and plant growth rates. The effects of ionic wind on plant growth are significant and heretofore not included in studies and reports of effects of electric fields on plants. Also, electric fields of either polarity applied to plant canopies enhance water evaporation. Electric fields of either polarity and normal to the general orientation of plant leaves will enhance water evaporation and water vapor movement away from the plant subsequently increasing plant transpiration and growth. This is particularly true for monocotyledonous plants, i.e., maize, rice, orchids, among many others, because stomatal openings in leaves tend to be found on both adaxial (upper) and abaxial (lower) leaf surfaces. Dicotyledonous plants, i.e., angiosperms (flowering plants), legumes (beans, lentils, peas, and peanuts) among many others, typically have stomatal openings only on the abaxial side of their leaves. Separating any effects of ionic wind and accompanying electric fields along with any charge buildup on leaf surfaces resulting from impinging ionic wind is difficult at best and not addressed in past electro-culture literature.

In accordance with the disclosed method, the disclosed method, which may be a bioelectric method such as an electro-biofortification method, comprises growing plant(s) inside a static or quasi-static non-ionizing electric field or fields which terminate on and penetrate inside plant tissue. Plants subject to the disclosed non-ionizing electric fields can be connected via a conducting pathway to the return circuit of the source, a high voltage power supply, of the electric field via substrate and or root and liquid nutrient feed, as will be discussed below in connection with the Figs. This pathway provides an opportunity for electroporation of the plants' roots to allow better absorption of nutrient ions, e.g., via opening up pores in the roots of the plants.

The plant performs as another dielectric similar the intervening air dielectric layer between the plant and the source of the electric field, the electrically insulated electrode and the electrical return circuit of the high voltage power supply. Positively charged insulated electrode will attract negative charge to external plant surfaces with the greatest charge density on plant surfaces closest to the external insulated electrode. The morphology of plant geometries and parts, i.e., acute angles, edges, needles and spines, and trichomes, among other surface features will tend to increase local electric field gradients, thus accumulating greater negative charge surface densities when the plant is exposed to a positive polarity electric field. Accumulated negative charge density on plant surfaces in a negative polarity electric field will diminish over time when the electric field is not present. Furthermore, positive charges are not as mobile as negative charges, electrons.

Negatively charged insulated electrode will repell negative charges on plant surfaces. This action reduces the density of negative charges on plant surfaces, thus reducing the electrical screen effect blocking a negative electric field from entering a plant leaf's surface. The negative electric field entering a leaf cuticle will progress further inside the leaf's interior creating an electric double layer at apoplastic barriers enclosing cellular symplastic material, cytoplasm, and thus drive the accumulation of nutrient cations, positively charged ions, e.g. iron, zinc, sulphur, magnesium, and a host of other nutrients required to support plant metabolic activity and subsequent human consumption satisfying human nutrient needs.

The upper limit of electric field strength, e.g., volts per centimeter, which could be applied to plants using this method is preferably not boundless. More specifically, too high a value may inadvertently result in extremely high electric fields capable of damaging plant tissue. Calculated electric field values may be locally amplified by plant and leaf topologies. For example, sharp points, tips of leaves, leaf hairs and other protuberant structures, and thin leaf edges will shape and intensify local electric fields. High electric field strength at the boundaries of these plant surfaces and air can initiate ionization of air molecules, as is known in the art. Plant tissue damage may result from thermal effects at leaf points of air ionization. Additionally, before the threshold of ionization is reached, buildup of electric charge density can promote electroporation which creates openings in leaf epidermis allowing a loss of cytoplasm. Visual indications of affected areas are color change, typically browning, and obvious tissue damage.

The benefits of the disclosed bioelectric method can be achieved at any electric field strength below critical values initiating plant tissue damage. Increased mineral nutrient uptake and use efficiencies and the added benefit of increased plant dry weight (yield) will be directly proportional to the applied electric field strength. A reasonable operating range is 1.0 to 2,000 volts per centimeter depending upon plant morphology, stage of plant growth, and ambient conditions, i.e., humidity and temperature. A good starting point is 1,000 volts per centimeter and adjust the voltage and or distance as conditions warrant. For example, maintaining a constant voltage on electrically insulated electrodes while adjusting the distance between the electrodes and plants may vary the electric field strength, electrode voltage divided by distance. Adjusting the electrode voltage, while keeping the distance, $d_2$ (FIG. 1), constant may accomplish the same result.

An electric field generated by the electrically insulated voltage charged electrode first penetrates and passes through the layer of electrically insulating dielectric which encapsulates or surrounds the voltage charged electrode. Additional layer(s) of optically transparent and electrically insulating dielectric material, e.g., polycarbonate, may be placed between the first dielectric layer, as mechanical support for example, in addition to the air or other gaseous dielectric layer surrounding the target plant canopy. Then the electric field penetrates the waxy lipid epidermal layer of leaves and their interior mesophyllic apoplastic cell wall layers.

In one non-limiting example embodiment of the disclosed method, the results obtained by this method include assuming electrostatic interactions involving an electrical double layer (EDL) between interior leaf cuticle and ion containing cytoplasmic mesophyll layers and penetrating electric field. The waxy hydrophobic electrically insulative cuticle of a plant leaf is the outer protective layer found on adaxial and abaxial sides of leaves. As an electric field penetrates and passes through the leaf cuticle and into the mesophyll layer, it encounters the boundary between the parallel cuticle and mesophyllic apolplastic layers. A weak electro-chemical double layer may exist at this boundary, but an electric field at this juncture will create an Electric Double Layer (EDL). The EDL will be composed of ions in the cytoplasm bounded by the lipid cuticle layer. The strength, volts per centimeter, and the polarity of the penetrating electric field will manipulate positions and motion of cytoplasmic ions and polar and dipole molecules near and within the EDL. The manipulation of the ionomic content of the cytoplasm in the leaf mesophyll by the imposed non-ionizing electric field is the motive force underlying the increased mineral nutrient uptake and use efficiencies resulting from utilization of the electro-biofortification method. Homeostatic processes regulating uptake, transport, and distribution of plant mineral nutrients will respond to imbalances in mineral ion concentrations in the mesophyll cytoplasm.

Reduction of plant mineral concentrations due to elevated level of $CO_2$ in the atmosphere may be directly related to reported alteration of leaf traits. For example, the ratio of leaf mass to leaf area is increasing, which directly implies that leaf thickness is increasing as the atmospheric $CO_2$ level increases. Elevated $CO_2$ is believed to be contributing to the increased leaf area and also to added carbon storage in leaf components such as lipid layer which is part of the leaf cuticle. If part of the increase in leaf carbon content includes the carbon rich lipid layer, then the layer's thickness is also increasing. Increases in the thickness of the dielectric lipid layer will affect the strength of any electric field penetrating the leaf and affecting the EDL interactions between the penetrating electric field and mineral ion distribution in the affected mesophyll cytoplasm. This reported mechanism of interaction between elevated $CO_2$ and increasing leaf thickness may be the underlying cause of ongoing reduction of plant nutrient concentration. This disclosed method offers a solution to the reduction of mineral nutrient and is directly related to the mechanism causing the ongoing reduction of mineral nutrient concentration in plants.

Figure 7:
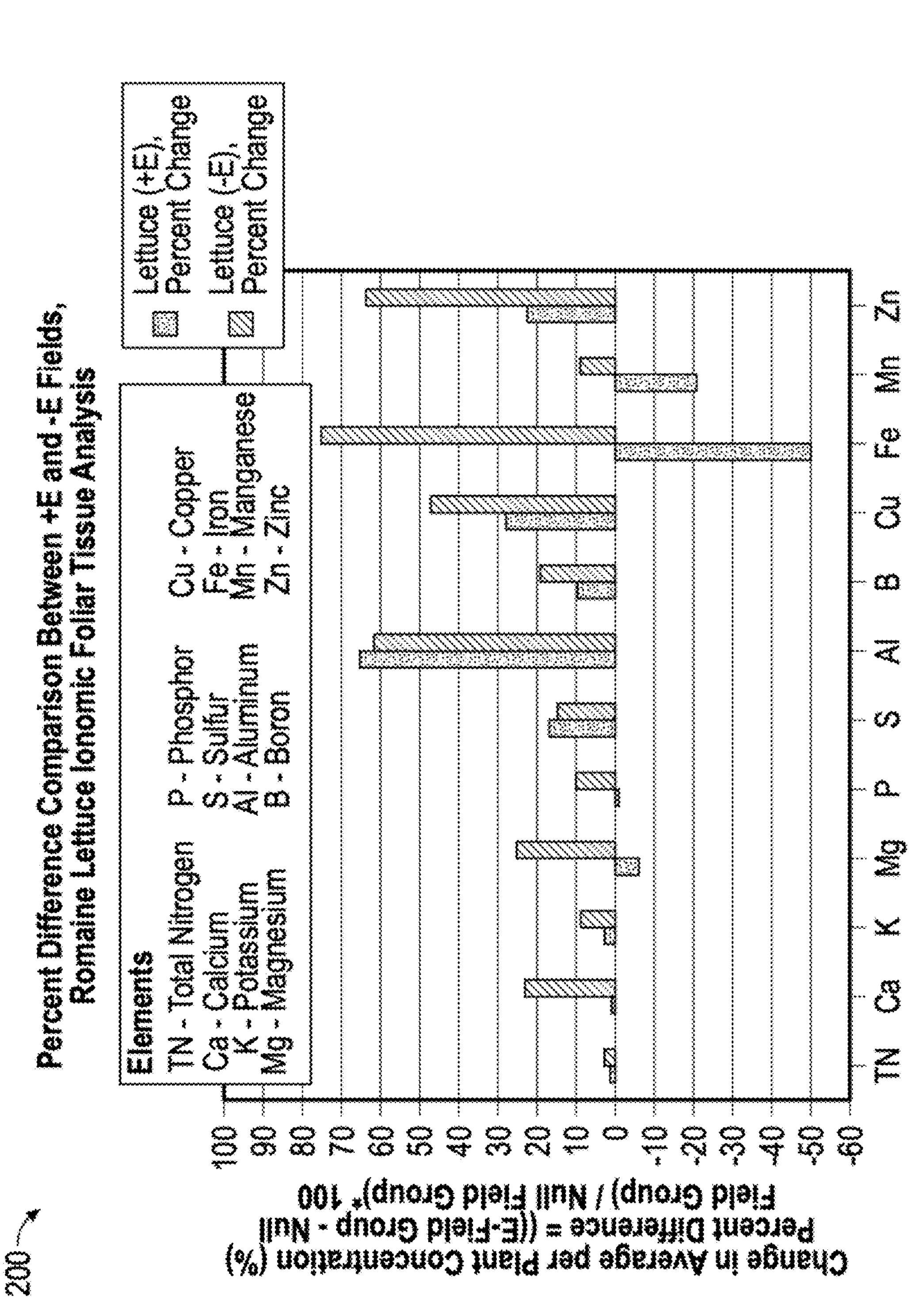
FIG. 7 is a chart comparing percent differences between an electric field group and a null or zero electric field group of vascular plant experiments showing results of the analysis of chemical elements between two different electro-biofortification experiments, one under a positive electric field and the other under a negative electric field each grown simultaneously with the null electric field group.

It is clear that the strength and polarity of the electric field selectively affects the concentration of mineral nutrients in the plant (e.g., see FIG. 7 and FIG. 8, and the associated discussion below). For example, a varying intensity negative electric field with no polarity reversal increases the concentration of macro- and micronutrient minerals in Romaine lettuce compared to a zero or null electric field and a positive static polarity electric field (FIG. 7). Aluminum included in the analyses is not considered to be a required plant nutrient, but it is important because of its toxicity to plants when in excess. The source of aluminum shown in the chart, FIG. 7, is believed to be the peat material contained in the lettuce substrates, whereas a varying intensity positive polarity electric field imposed on Romaine lettuce increased concentrations of all the elements compared to a zero or null electric field with the exceptions of iron, magnesium, and manganese. Also, there is a notable increase in sulfur concentration. Sulfur molecules are found in coenzyme A, vitamin B5, and other enzymes produced by crop plants. Mineral nutrients may be stored in other plant vesicles and structures, for example vacuoles and trichomes. Of note is the substantial negative electric field increase in average per plant dry weight, greater than 30 percent as compared to less than two percent for the positive electric field treatment group. The dry weight increase of the negative electric field lettuce group was not accompanied by reduction of macro- and micronutrient concentrations, FIG. 7. The 30 percent plus increase in dry weight yield is an indicator of increased nutrient use efficiency when a negative polarity electric field is applied to the subject lettuce plants. The electric field mean value of plus polarity experiment was +800 volts/cm with a superimposed sine wave with a peak value of +960 volts/cm and a minimum value of +640 volts/cm. Alternately, the electric field mean value of negative polarity experiment was −800 volts/cm with a superimposed sine wave with a peak value of −960 volts/cm and a minimum value of −640 volts/cm. All voltages are with respect to earth ground.

Either electric field polarity produces selective increased levels of mineral nutrient concentrations in plant leaves. Combining both polarities, negative and positive, serially or programmatically at different time intervals during a plant's growth cycle will produce synergistic outcomes, i.e., increases in mineral nutrient concentrations. Reversing the electric field polarity along with slowly varying the insulated electrode voltage during each time interval acts to force cytoplasmic ions, polar, and dipole molecules to undergo changes in position, motion, and orientation. Thus, the variations in local ion density, osmolarity, in mesophyll cytoplasm should trigger changes in ionomic homeostatic processes to achieve a dynamic steady state and promote increased nutrient uptake and use efficiencies.

A constant voltage charged insulated electrode voltage is an alternate embodiment of the bioelectric method. Electric field strength, volts per centimeter, remains a controlling variable to achieve desired ionomic concentrations above normal ambient electric field environment. Periodic static voltage polarity reversal should be considered in this instance. An alternative approach is to impose a dithering signal on the static high voltage. Since the high voltage on the electrode is static, one example includes superimposing a 60 Hertz dither signal onto the high voltage output of the power supply. In addition, particularly for natural sunlight powered controlled environment agricultural operations such as greenhouses, the electric field strength of an electro-biofortification method should be in phase with the strength of light intensity, i.e., maximum electric field strength should coincide with maximum sunlight exposure, if very long timing intervals of electric fields of either polarity are contemplated. In a preferred embodiment, the disclosed electro-biofortification method should always be active during active plant photoperiods. Continuous application of the electric field may be desirable. For example, leaving the electric fields continuously active even when plant photosynthesis is reduced at nighttime may be preferred, except during periods of maintenance or required physical access to plants.

In addition to method variables of electric field strength and polarity, the variable of exposure time must be considered. Plants, like all living things, regulate internal metabolic processes to maintain balanced stable internal states while affected by external environmental abiotic changes, which is defined as homeostasis. For example, iron uptake, transport, and distribution in a plant is regulated through an iron specific homeostatic process similar to other mineral homeostatic processes. The end-point is to maintain a dynamic equilibrium, steady-state, within the plant of an iron ion concentration level. Several processes are involved in plant iron homeostasis. Iron uptake, through roots, transport and distribution where needed in the plant, use in metabolic functions, storage functions, and finally regulation of all the foregoing iron homeostatic processes. Plant nutrient homeostatic processes require time to function, thus the time intervals (see FIGS. 6A-6G), selected to operate a variable electric field at a polarity and selected field strength should be taken into consideration before configuring an electro-biofortification method to increase and enhance plant ionomic uptake and use efficiencies.

One example would be promoting seedling growth compared to later growth stages by configuring the electro-biofortification voltage waveforms, polarities, and time intervals differently for successive stages of plant growth. Seedlings are shorter in height and likely more fragile than the same plant weeks later. Therefore, shorter time intervals for serial electric field polarity waveforms and possibly lower electric field strength may be more effective at the seedling stage of plant growth and development, in one embodiment of the disclosed method. As the same plant grows taller and is less fragile and producing more plant mass, longer time intervals and increased intensities of electric field strength are likely to be more productive. Another plant development stage which may be targeted for different electric field configurations will be specific nutrient loading during seed formation, if necessary. The electric field parameters can be tailored to the entire plant growth cycle by programmatic and possibly coupled with external plant sensor(s) control of the high voltage power supply.

Potential applications of the bioelectric method includes crop plants used for human consumption, fodder crop plants for animal consumption including microgreens grown for dairy cattle consumption to augment nutrient fortification of milk products, botanical agriculture and horticulture, forest agriculture, and phytoremediation of toxic heavy metal contaminated soil and aquifers and bodies of water. The disclosed bioelectric method will amplify plant uptake of heavy metal ions.

The disclosed bioelectric method also applies to plant seed loading during the plant's maturation cycle. Seed loading is the addition of nutrients during seed formation by the plant, thus ensuring the seed's survival and successfully function as a progenitor of a new plant.

The disclosed bioelectric method also applies to modifying a color of plant flower petals. The interaction of pigments and metal ions in plant flower petals will change the color of plant flower petals. By applying the disclosed method to growing flowing plants, the color of the plants' flower petals may be changed. Mineral nutrients associated with particular flower colors must be available to the plant for uptake and utilization by the plant's flower petal tissue. For example, increasing in *Gerbera* flowers, $Fe^{2+}$ amount in petals increase redness the (a*) value, Chroma (C*) value and decrease lightness (L*) value. Color parameters may be explained according to the Commission International de L'Eclairage (CIELAB), which is an objective method used to define and communicate color. The effects of metal ions will be specific to plant species and variety. Other divalent cations which can serve to contribute to color changes of *Gerbera* are Copper, Cu, Calcium, Ca, and Magnesium, Mg. Other factors, such as pH and available cations in the plants' nutrient, along with genetics and intra cellular pH levels and competing mineral cations, also play a role in coloring plant flower petals.

Although the bioelectric method is applicable to open area agriculture, it is likely to not be practical until autonomous farm equipment similar to the Autonomous Sprayer, by John Deere of Moline, Illinois, becomes available with electrically insulated boom electrodes replacing the sprayer components. The autonomous unit would expose plants to a variable electric field as it slowly moves down rows of plants. A constant voltage on the boom electrode would still provide a varying electric field by just moving along the row of plants. Two electrode booms could provide plant exposure to both plus or minus or double a single polarity as needed. Autonomous and automated, transversing boom systems could apply to greenhouse, vertical farming, orchard, and/or vineyard farming operations. Relatively small agricultural plots could be amenable to the application of the method. Arable and open area agriculture should benefit from the application of bioelectric methods to crop seedling production intended for transplantation. Controlled environment nursery transplants should benefit from application of the disclosed electro-biofortification method and system by forcing maximum nutrient uptake and metabolic utilization and increased rate of growth before separately transplanting into open plots. As a result, transplants with additional nutrient loading would be given a head start in growth and development.

All of the potential benefits of this invention are realized under the same embodiment; essentially plants grown under the influence of slowly varying electric fields preferably a negative polarity electric field with the plant's roots experiencing electroporation during the electric field exposure and sufficient mineral content available in soil or liquid nutrient in hydroponic growing conditions. The benefits outlined such as electro-biofortification, Agromining, phytoremediation, and flower petal coloring are all dependent upon controlling and enhancing the uptake of mineral cations by the plant using controlled slowly varying external non-ionizing electric fields. Negative polarity electric fields are the preferred embodiment, although occasionally reversing polarity is a useful technique to enhance the uptake of mineral ions, shake up the distribution of polarized dipole molecules in plant leaf cytoplasm and clear out stagnant double layer ion distributions within the plant's leaves and nutrient transport elements, e.g., xylem and phloem structures.

Controlled environment agriculture (CEA), i.e., greenhouses, hydroponics, aquaponics, vertical farming, and container farming, is a preferred embodiment of the disclosed electro-biofortification method. CEA operations incorporating electro-biofortification method technology for individual or home or small business use are also practical embodiments. Additionally, soil and plant nutrient containing toxic metalloids, such as aluminum, arsenic, lead, and other elemental elements, which may be toxic to plants, humans, and livestock, will advantageously be drawn into plants by the disclosed method, therefore reducing or eliminating metalloid toxicity of plant soil and nutrient during plant growth. Lastly, solar powered and portable CEA systems could incorporate the disclosed electro-biofortification method technology for use in remote portions of the world. Off-world use of electro-biofortification technology would amplify the bioavailability of nutrients in food produced during long space flights and support agricultural operations on planets and the Earth's moon.

Referring to the drawings, representative embodiments of the bioelectric method and system embodiments are presented in FIGS. 1 through 6G. The differences between the embodiments are seen in the manner of insulated electrode configuration and design. Equation 1 and Equation 2, below, may be used to calculate or estimate the voltage and therefore the electric field, volts per unit distance (centimeter, cm) between the outside dimension of the electrically insulated electrode and the top or nearest surfaces of the plant canopy to the electrode:

$$V = \left(\frac{\kappa_2 \kappa_1 d_2}{\kappa_2 d_1 + \kappa_1 d_2}\right) V_0; \quad \text{Equation 1}$$

-continued $$\kappa = \frac{\varepsilon}{\varepsilon_0} \quad \text{Equation 2}$$

where V corresponds to a voltage at an exterior surface of the insulator 4, $V_0$ corresponds to a voltage spaced a distance $d_1$ (FIG. 1) at the electrode 6, $k_2$ corresponds to a dielectric constant of an atmosphere (e.g., air) between the bottom of the insulator 4 and the vascular plant, $k_1$ corresponds to the dielectric constant of the insulator 4, $d_1$ is the thickness of the insulator 4, $d_2$ corresponds to a distance from a closest point of the insulator 4 to the vascular plant, k corresponds to a dielectric constant or relative permittivity, & corresponds to a permittivity of a material, and so corresponds to a permittivity of an absolute vacuum.

Figure 5:
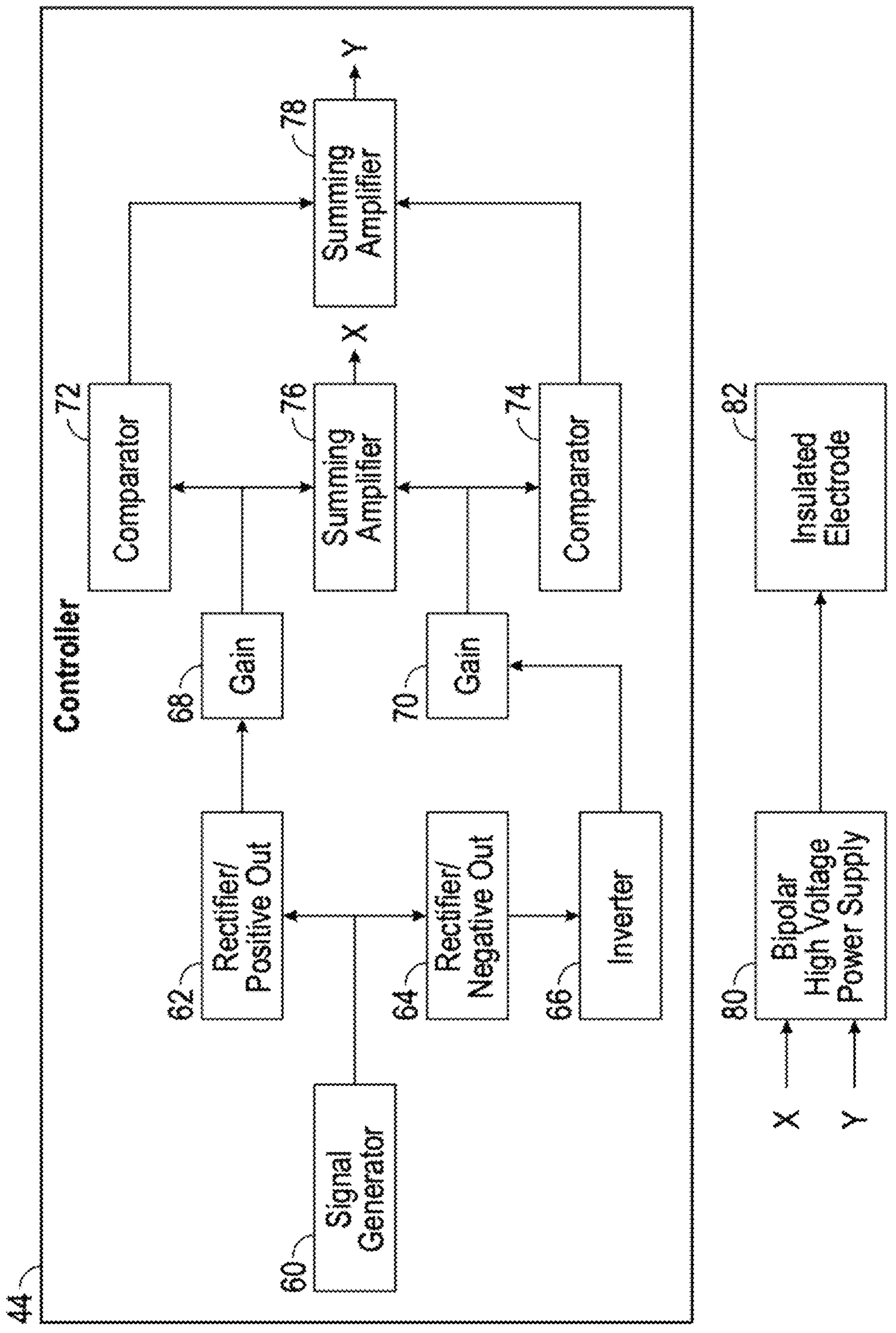
FIG. 5 represents a block diagram of an analog controller circuit using a waveform signal output of a signal generator, which provides a relatively low frequency waveform to the controller.

It will be appreciated that the electric field, volts/cm, is a critical variable used to set up and operate the bioelectric method and system. FIG. 5 is a block diagram of a dedicated analog electrical circuit to drive remotely a Matsusada Precision Inc. model K12-15R-LCs bipolar high voltage power supply. FIGS. 6A-6G shows the various electrical waveforms at critical points of a dedicated analog controller circuit designed to remotely control the Matsusada bipolar high voltage power supply. In one example, the voltage output from the high voltage power supply 40 is an oscillating voltage output controlled by the controller 44, and the oscillating voltage output oscillates within +/−25 percent of an average high DC voltage level of the voltage output. In this manner, the voltage output can be considered to be a pump for leaves of the vascular plant.

FIG. 7 is a chart showing the comparison of results from two Romaine lettuce experiments conducted to compare the electric field treatment to simultaneously grown side-by-side null or zero electric field plants. One experiment employed a slowly varying positive electric field and the second employed a similar varying negative electric field. The harvested and dried lettuce leaves from the null and electric field groups of each experiment were separately weighed and analyzed by the University of Maine Analytical Lab and Soil Testing Service. Twelve chemical elements were reported out by percent or parts per million of total dried weight for each, null and electric field, group. The percent difference between the null and electric field group for each polarity, positive and negative electric field experiments were calculated for each of the analyzed elements. The chart compares the percent difference of each of the two polar, positive and negative, experiments for each analyzed chemical element. For example, the iron chemical element analysis shows a 50 percent reduction in concentration in positive electric field group compared to its simultaneously grown null or zero electric field group of plants. This is plotted on the chart, FIG. 7, alongside the 75 percent increase of iron concentration in the negative electric field analysis compared to its simultaneously grown side-by-side null or zero electric field group. The result shows the difference between iron concentration in Romaine lettuce grown under positive and negative non-ionizing quasi-variable intensity electric field conditions (without any voltage polarity reversal in this instance). The remaining eleven elements should be similarly viewed as the iron element treatment shown in FIG. 7. It should be noted that the negative electric field group yielded greater than 30 percent dry weight as compared to the companion null or zero electric field group. No reduction of the mineral element concentrations is evident. However, the positive electric field group dry weight comparison with its null field group yielded an increase of 2 percent in dry weight along with significant reduction or reduction in some of the critical mineral nutrients, iron (Fe), manganese (Mn), and magnesium (Mg), but the positive electric field group may enhance sulfur (S) concentration, in one example.

The embodiments shown in FIGS. 1-6G are only illustrative; many other configurations are possible. For example, plants could be grown on vertical substrates or climbing on vertical poles or vertically positioned stretched lines of plastic fishing line. Additionally, plants could be grown on cylindrically shaped lattices with a light source and a cylindrically shaped insulated electrode in the center of the plants or surrounding the outside of the plants grown on the inner cylinder. Insulated electrodes could be located both on the adaxial side and the abaxial side of plant canopies, legumes or indiscriminate plant morphologies such as some tomato cultivars. An important consideration is that electric fields are not affected directly by gravity, whereas the electrically insulated electrode mass is affected by gravity as are other components of controlled environment agriculture operations.

FIG. 1 illustrates the basic relationships of an example bioelectric arrangement, in accordance with one non-limiting embodiment of the disclosed method. A number of electrically conductive electrodes 6, which may be cables, can be completely encapsulated by an number of insulators 4, and charged to a voltage by the electrically connected high voltage output of a high voltage power supply 40 which generates an electric field 7 surrounding the electrode 6. In one example, the insulator 4 conformally coats the electrode 6. The strength of the generated electric field 7 is volts per unit distance $d_2$ e.g., centimeters from a top 14 (FIG. 1) of a plant 12 or plant canopy to the bottom of the insulated electrode FIG. 1.

As shown in FIG. 1, the plant 12 has roots 24, a primary stem 20 growing from the roots 24, and secondary stems 18 terminating at leaves 16. The plant 12 is electrically connected through substrate 22 and/or the roots 24 to the circuit return of the high voltage power supply 40 (e.g., via an electrical connection between a metallic tray 28 and the high voltage power supply 40). Accordingly, it can be appreciated that the substrate 22 may be anchoring the plant 12 and the upper roots 24, but the roots 24 may drag along the tray 28 by way of the liquid nutrient. Furthermore, the electrical path is preferably from earth ground which is electrically connected to the return side of the high voltage power supply 40. The electrical path may include a portion of the roots 24 in contact with the liquid nutrient which in turn is in electrical contact with the metallic conductive tray 28, which in turn may be in electrical contact with earth ground and the return side of the high voltage power supply 40.

As shown, the roots 14 are configured to be located in the substrate 22 (shown in simplified form connected to the stem 20, and also disposed in a conductor, such as the tray 28). The substrate 22, as shown in FIG. 1, may then be considered to have a top layer 26 in the tray 28. Additionally, in a suitable alternative example, the conductor may present in the form of a wire. Furthermore, in one example, the tray 28 is preferably electrically grounded to an earth ground 32 via the electrical connection 30.

In FIG. 1, the electrodes 6 are intended to be located between sources of light (e.g., light emitting diodes (LED's) 10) such that potential light blocking interference between LED's 10 and the plant 12 is minimized, if not eliminated. As shown in FIG. 1, the high voltage power supply 40 is preferably electrically connected to the electrodes 6 and also electrically connected via a high voltage return of the power supply 40 to the metal tray 28, which may contain liquid nutrient and the plant roots 24. In example, the high voltage power supply 40 is a four quadrant, sink and source, switch-mode high voltage power supply with analog remote-control functionality. Moreover, as will be discussed below, electrically connected to the high voltage power supply 40 is a controller 44 for controlling the voltage out of the power supply 40.

It will also be appreciated that Equation 1, above, provides for calculation of estimated voltage V between an exterior of the insulated electrode 6 given the value $V_0$ of the high voltage power supply 40, and the values of the dielectric constant κ1 of the insulator 4, the thickness d1 of the insulator, the distance d2 between the bottom of the insulator 4 and the top 14 of the plant 12, and the dielectric constant of air κ2.

Equation 2, above, calculates the dielectric constant κ of a dielectric material as a ratio of its permittivity ε to the permittivity of free space so. Equation 2, above, calculates the dielectric constant or otherwise known as the relative permittivity of dielectric material. The dielectric constant value, κ1, of the insulator 4 and the dielectric constant value of air, κ2, as shown in FIG. 1 are needed in Equation 1 to calculate the voltage, V, between the bottom of the electrically insulated electrode and the top of the plant 12 in FIG. 1. The dielectric constant property of insulation material does not have any physical units for it is the ratio of two intrinsic material properties, permittivity, with the same physical units, F/m (Farads/Meter).

Figure 2A:
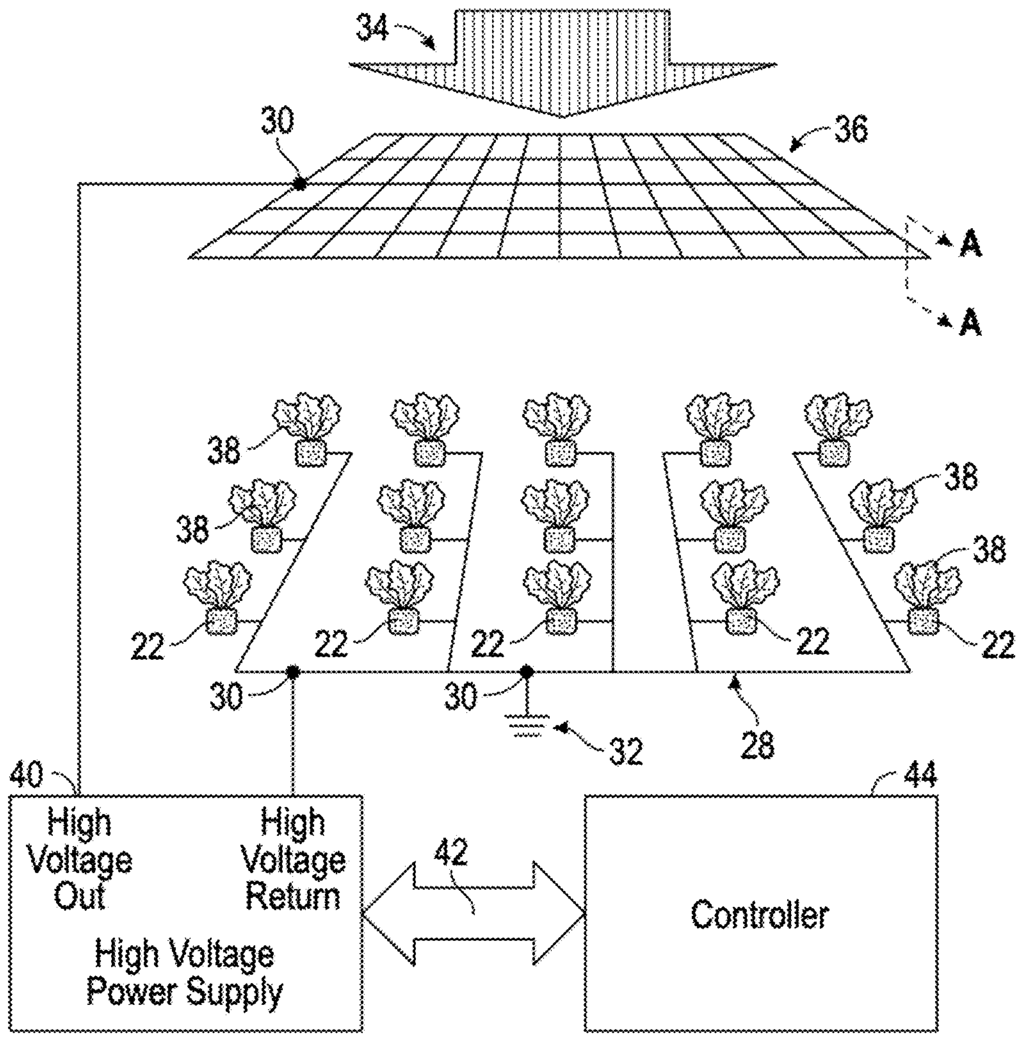
FIGS. 2A and 2B are simplified views of one embodiment of a system and section view of a portion of the system, respectively, showing a light source and an insulated metal screen electrode electrically connected to a high voltage output of a high voltage power supply, and an array of lettuce plants between the screen electrode and a return pathway to the high voltage power supply, and without the electric field, for ease of illustration.
Figure 2B:
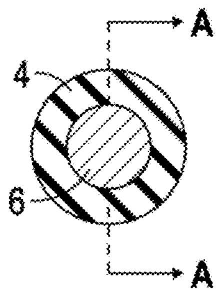

FIG. 2A is one embodiment of the disclosed system showing a light source 34 (artificial or sunlight), an insulated metal screen electrode 36 electrically connected to the high voltage output of the high voltage power supply 40, and an array of vascular plants (e.g., lettuce plants 38) between the screen electrode 36 and the plants 38 which is electrically grounded to the earth ground 32 as well as the return circuit to the high voltage power supply 40. FIG. 2B is a section view of a portion of the system of FIG. 2A, showing the electrode 6 and the insulator 4. The light source 34 for plant growth is shown as above the screen electrode 36, such that the screen electrode 36 is located between the light source 34, which may be an artificial light source, and the plants 38. In suitable alternative examples, it is contemplated that the electrode 6 may be located offset with respect to an artificial light source.

Electrical insulation in accordance with the disclosed method may be any material which meets the dielectric strength, volts/unit thickness, which ensures no air ionization, personnel safety, and prevents electrical breakdown if the screen would come in contact with liquids or any other electrical conductor with a path to earth ground. For example, the insulator 4 may have a dielectric strength of between 15-120 kilovolts/mm, and be made of Teflon, polyethylene, and polycarbonate materials. The metal screen 36 is configured to extend beyond the array of plants 38 at least the width of one fully grown plant row and similarly for the other ends of the screen. The screen length and width dimensions can just map the plant array below with some shaping of the outer edges to distribute the electric field more evenly across the entire plant array. Any screen electrode will reduce the amount of light to plants below. Screen opening dimensions and the gauge of the screen wire will be the determinative factors in considering light intensity reduction. The disclosed bioelectric method advantageously increases plant growth rate and size (yield) in addition to increasing nutrient concentration despite nominal light transmissions losses due the intervening electrode screen. As a result, the potential of increased yield could more than offset light intensity reductions brought about by the introduction of insulated electrodes between light sources and plants. The plants 38 shown represent lettuce growing in substrates 22 which are electrically connected to the earth grounded circuit via a conductor 28, which may be a metallic tray holding substrate, or a wire. Electrical connections 30 are identified to show high voltage and return circuits connections to the electrode and ground, respectively. The high voltage power supply 40 can be any low current, milliamps, unipolar or bipolar direct current, DC, voltage generator capable of generating and supplying a low capacitance load adjustable voltages up to at least 15 to 20 kilovolts.

Preferably, the output polarity should be negative relative to earth ground 32. A bipolar output power supply should be used, if possible, to take full advantage of the disclosed bioelectric method as discussed earlier. The high voltage power supply 40, either unipolar or bipolar, should have remote signal control capability. One example bipolar high voltage power supply is manufactured by Matsusada Precision Inc. (Charlotte, NC) Reversible Polarity & High Stability High Voltage Power Supply, Model K12-15R-LCs. This power supply allows polarity, voltage level, constant current (CC) or constant voltage (CV) mode and status, high voltage out control, and output current and voltage monitor to be remotely controlled and monitored. The high voltage power supply requires 24 vdc input power. In one example, the controller 44 is analog circuitry specially designed for this application. In another example, the controller 44 is computer software and programming using LabView coupled with analog/digital interface components from National Instruments (Austin, Texas).

Figure 3A:
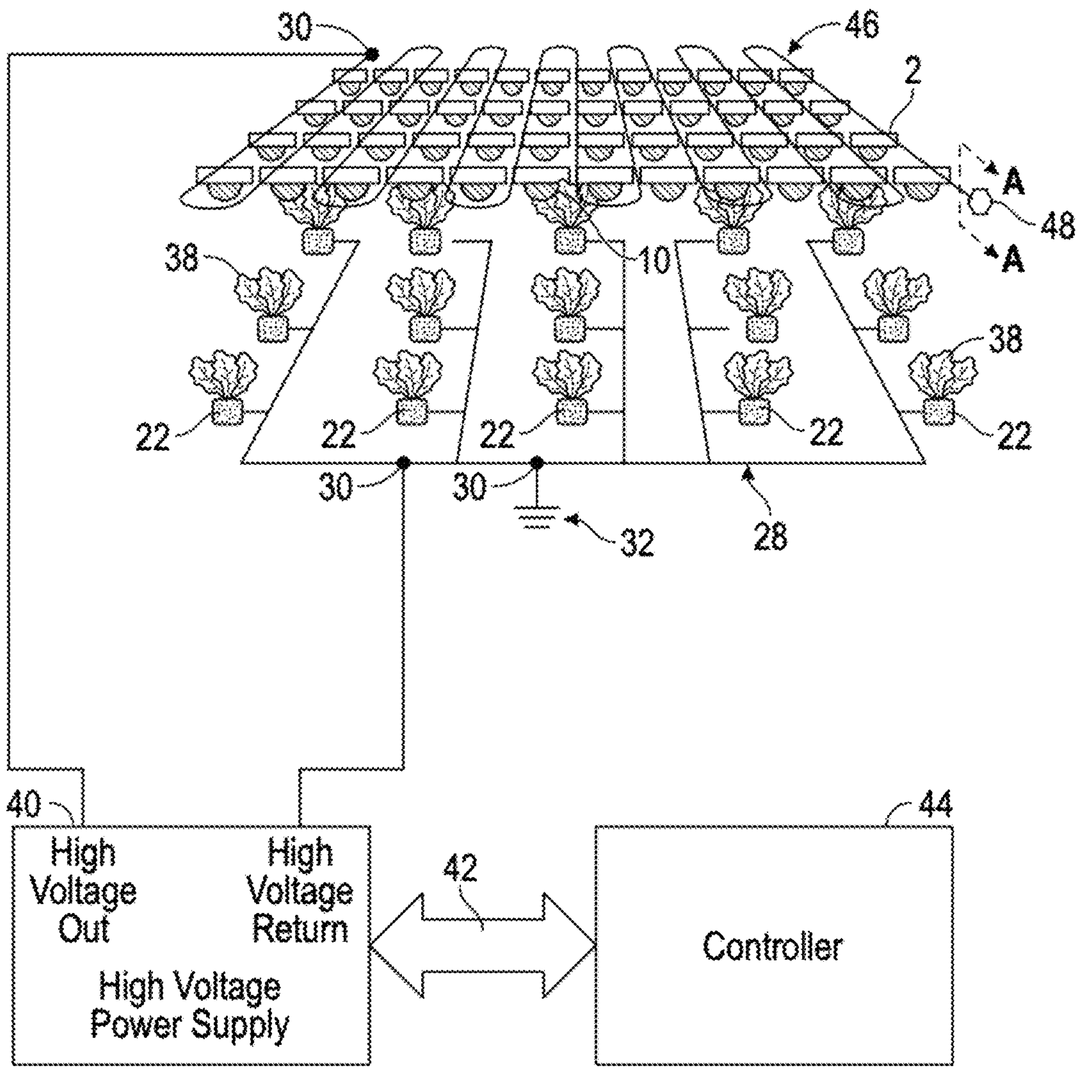
FIGS. 3A and 3B are simplified views of one embodiment of a system and section view of a portion of the system, respectively, which incorporates an insulated wire cable is located between light assemblies and is electrically connected to a high voltage output of a high voltage power supply.
Figure 3B:
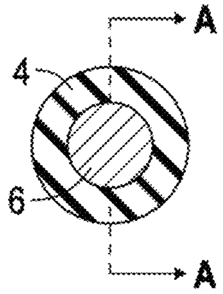

FIG. 3A is one embodiment of the disclosed system, which incorporates an insulated wire cable 46 located between sources of light (e.g., LED light assemblies 2), and is electrically connected to the high voltage output of the high voltage power supply 40 and terminated with high voltage insulation 48 at the end of the insulated wire cable 46. FIG. 3B shows a section view of a portion of the system of FIG. 3A, and shows the electrode 6 (e.g., as part of the cable 46) and the insulator 4. FIG. 3A shows an electrode configuration employing an electrically insulated metal conductor cable. In one example, the cable 46 preferably does not have any electric shielding such as found in shielded signal cables, i.e., RG-58 signal cable. Electric cable such as FEP insulated wire is preferred for an electrically insulated electrode. FEP has a dielectric constant of 1.9 at one Hertz and a dielectric strength of 22 kilovolts per millimeter. FEP, or Fluoroethylene propylene, is the melt-processable version of PTFE. FEP has very similar properties to PTFE, Polytetrafluoro ethyelene (Teflon), but has a lower maximum operating temperature of +200° C. However, FEP can be more easily processed and can be easily welded and re-molded into complex profiles. CR PTFE is corona resistant PTFE and withstands DC high voltage far above rated dielectric strength and lasts for very long time under high voltage conditions. CR PTFE jacketed wire would be the best choice for corona resistance, breakdown strength, and longer service life. Another consideration when choosing high voltage cable is consideration of semiconductor bonded or taped conductor high voltage cable, different from semiconductor transistor material. Semiconductor material is placed between the conductive center wire and the insulation. The purpose of the semiconductor layer is to reduce corona and possible arcing within the small spaces and irregular surface shapes of wire and what would be normal insulation surrounding the wire. The semiconductor layer bonds to the conductor surfaces and evens out the voltage along the high voltage conducting wire.

Figure 4A:
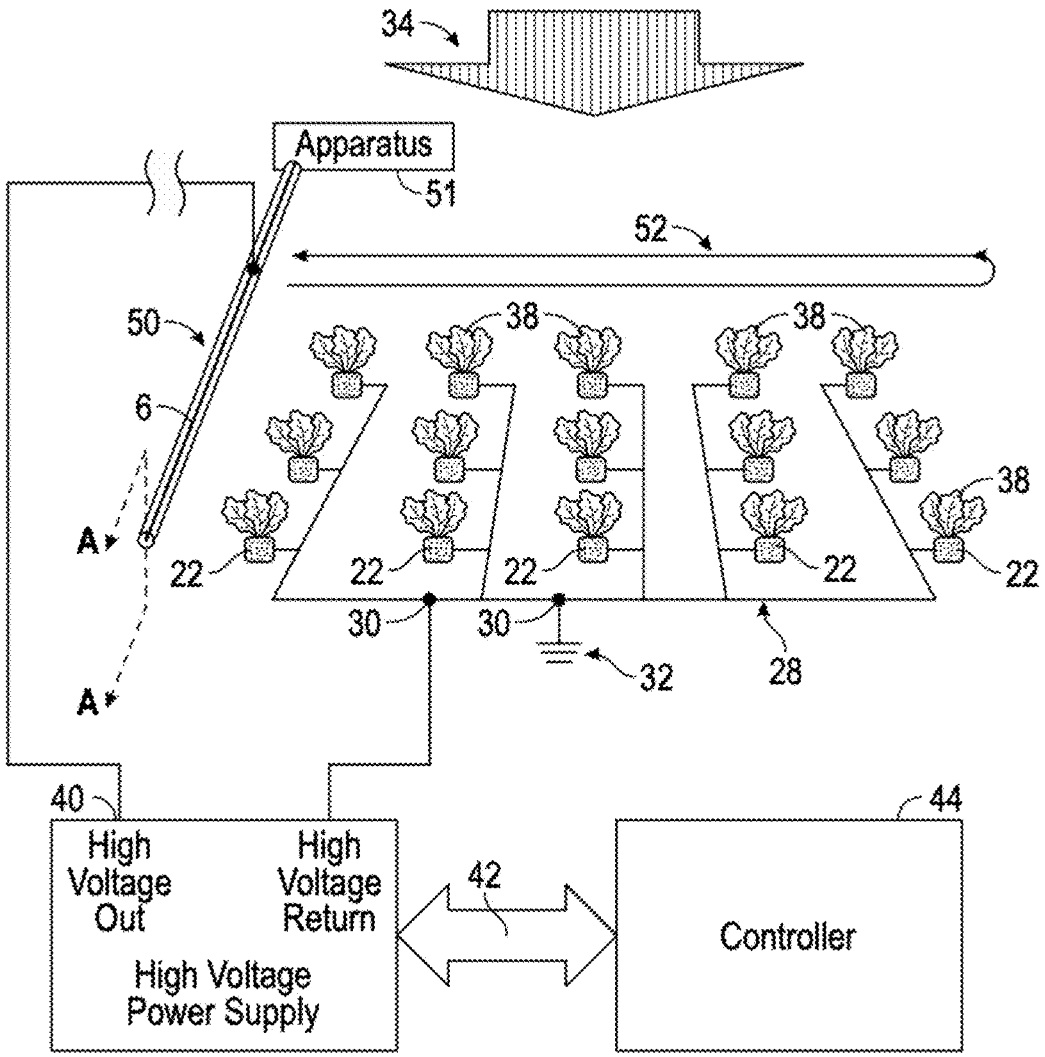
FIGS. 4A and 4B are simplified views of one embodiment of a system and section view of a portion of the system, respectively, which incorporates an assembly of an electrically conductive electrode inside of a insulating plastic tube, and wherein the assembly is mechanically configured to traverse over an array of vascular plants in order to periodically expose the plants to an electric field generated by a high voltage power supply, and without the electric field, for ease of illustration.

FIG. 4A shows a method employing a traversing the electrically insulated electrode 6. As shown in FIG. 4A, the system includes at least one extendable arm (e.g., tube 50), which is coupled to an apparatus 51. In one example, the apparatus 51 is an autonomous vehicle (e.g., containing wheels, a drive mechanism, processor, etc., and configured to controlled remotely) configured to be operated without a driver directly on or in the apparatus 51. The apparatus 51 may also comprise the high voltage power supply 40, in one example.

Figure 4B:
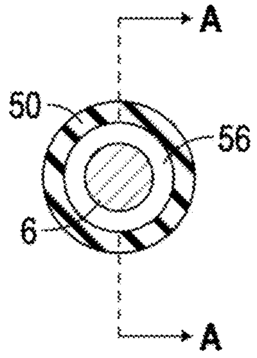

As shown in FIG. 4B, the tube 50 may have an annular-shaped cross section, and the electrode 6, which may be a high voltage wire, may be located in the interior of the tube 50, e.g., such that there may also be a space 56 in the interior of the tube 50 (e.g., the tube 50 may be relatively rigid and not conformally coat the electrode 6). In one example, the tube 50 is made of an insulative material, and functions similar to the insulator 4 (FIG. 1), e.g., assists with the prevention of creation of an ion wind. Additionally, in one example, the apparatus 51 is configured to cause the tube 50 to traverse with respect to the sessile (e.g., not moving) vascular plants 38. In this manner, varying of the electric field may be caused by movement of the apparatus 51, in addition to via variation from the high voltage power supply 40.

Accordingly, it will be appreciated that the disclosed method of optimizing an ionomic content of the plants 38 may further include the step of moving the electrode 6 transversely with respect to the sessile vascular plants 38 via the apparatus 51, which is preferably coupled to the electrode 6, in order to directly cause a strength of the electric field with respect to the sessile vascular plant 38 to vary. In this example, it will be appreciated that the voltage output by the high voltage power supply 40 may be constant. The electric field sensed by the vascular plants 38 would increase as the moving tube 50 and electrode 6 approaches the plants 38, reach maximum electric field strength as the tube 50 and electrode 6 are directly overhead of the plants 38, then the electric field strength with respect to the sessile plants 38 would decrease as the tube 50 and electrode 6 moves away front the plants 38. Thus, the electric field strength relative to plant surfaces varies with the traversing tube 50 and electrode 6; despite the voltage on the electrode 6 remaining constant, in one embodiment.

In one example, the tube 50 is an optically clear polycarbonate material which primarily serves as mechanical support for the high voltage electrode 6, and also to insulate the electrode 6.

The polycarbonate tube 50 with the electrode 6 inside is shown as traversing in a direction 52 along the tops of the plants via movement of the apparatus 51. The electrode 6 can continuously travel back and forth some predetermined distance away from a rest or storage position. This embodiment of the bioelectric method would allow more complete physical access to plants and minimize loss of light intensity by fixed in location screen electrodes. A vertically positioned traversing electrode may be an effective and practical electrode arrangement for plants grown vertically or those with climbing traits, e.g., legumes and tomatoes. Hanging and moveable electrically insulated electrodes is another arrangement which could be employed to reduce physical interference issues and still provide some level of electro-biofortification to plants.

FIG. 5 represents a block diagram of the controller 44 circuit using the waveform signal output of the signal generator 60, to control the polarity, timing, and output voltage level of a bipolar high voltage power supply 80 connected to an insulated electrode 82 of one embodiment of an electro-biofortification system. FIGS. 6A-6G are voltage waveforms produced by circuits in the controller of FIG. 5.

The signal generator 60 is a Function/Arbitrary Waveform Generator, Model DG2052, manufactured by Rigol Technologies, 10220 SW Nimbus Ave. Suite K-7, Portland, OR 97223. The signal generator 60 produces a sine wave, Signal Generator Out 84. The sine wave signal is connected to the inputs of two rectifier circuits, Rectifier Positive Out 62 and Rectifier Negative Out 64. The Rectifier Positive Out signal 86 is connected to the input of a Gain circuit 68. The Rectifier Negative Out signal 88 is connected to the input of an Inverter 66. The reason both signals have to be positive polarities is that the Bipolar High Voltage Power Supply, BHVPS, control circuits accept only positive voltage values from 0 to +10 volts. The BHVPS will only accept a TTL, Transistor Transistor Logic, signal to set the polarity of the BHVPS output high voltage. The Inverter 66 output signal is connected to the input of the second Gain 70 circuit. Both Gain circuits 68 and 70 outputs are connected to a Summing Amplifier 76. The output of the Summing Amplifier 76 is connected to the BHVPS control input pin for full scale output voltage control 0 to +10 volts. The Summing Amplifier 76 provides a positive 0 to +10 volt signal representing each half phase of the original sine wave, but each half phase signal level is controlled by the appropriate Gain circuit, 68 for the positive phase of the sine wave and 70 for the negative sine wave phase.

Figure 6A:
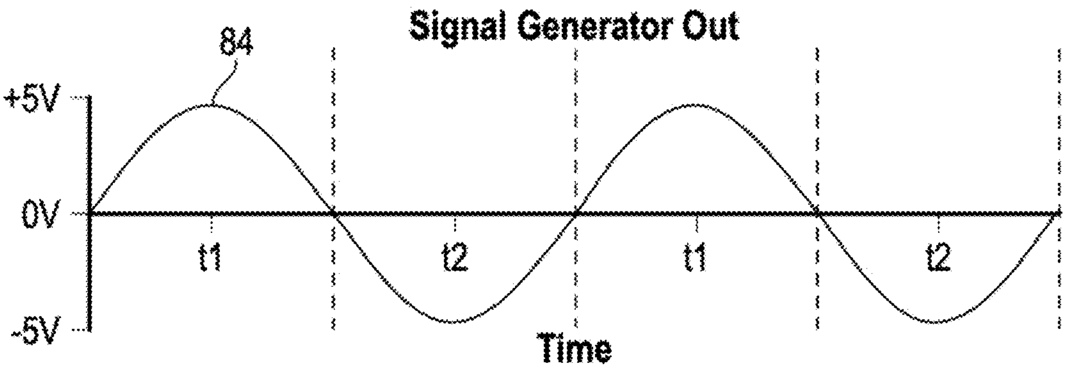
FIGS. 6A-6G represent first, second, third, fourth, fifth, sixth, and seventh low voltage waveforms, respectively, at various stages of the analog controller of FIG. 5.
Figure 6B:
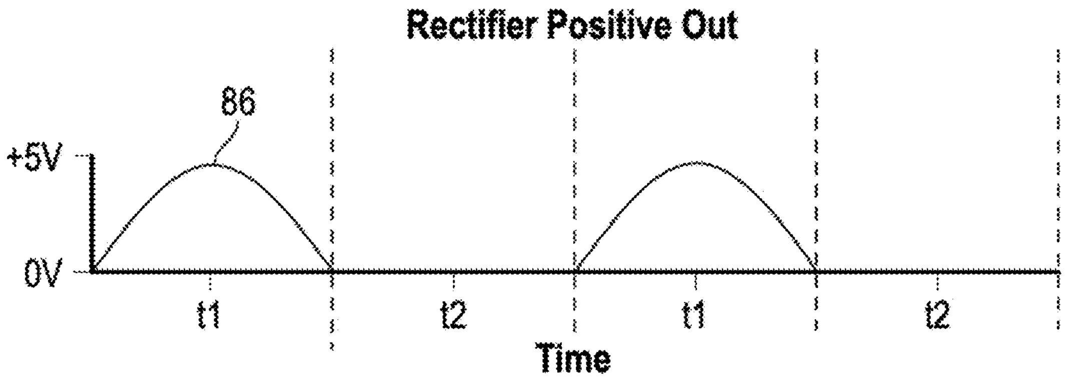
Figure 6C:
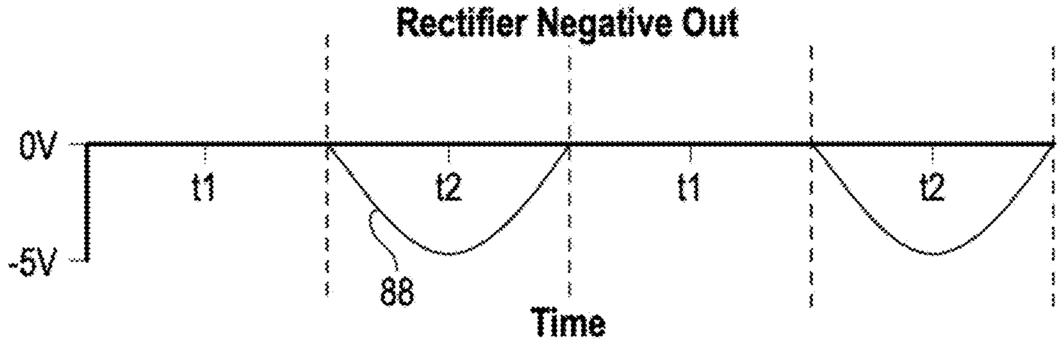
Figure 6D:
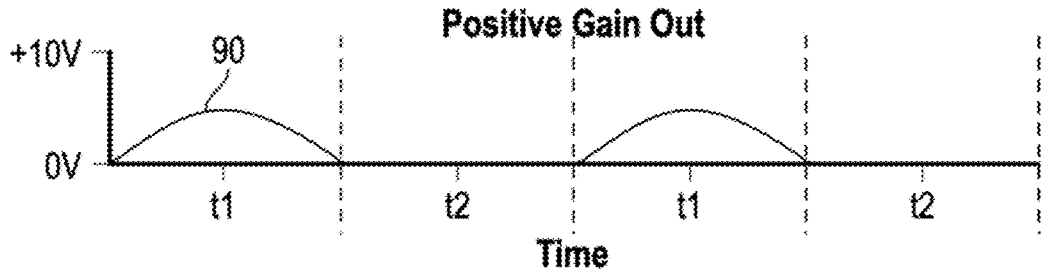
Figure 6E:
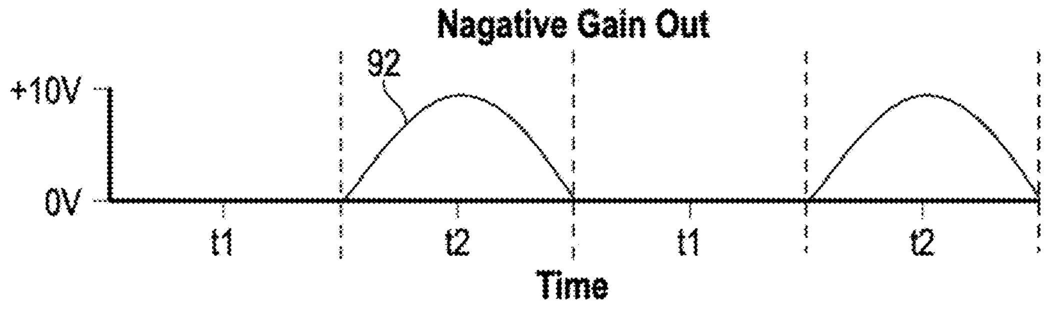
Figure 6F:
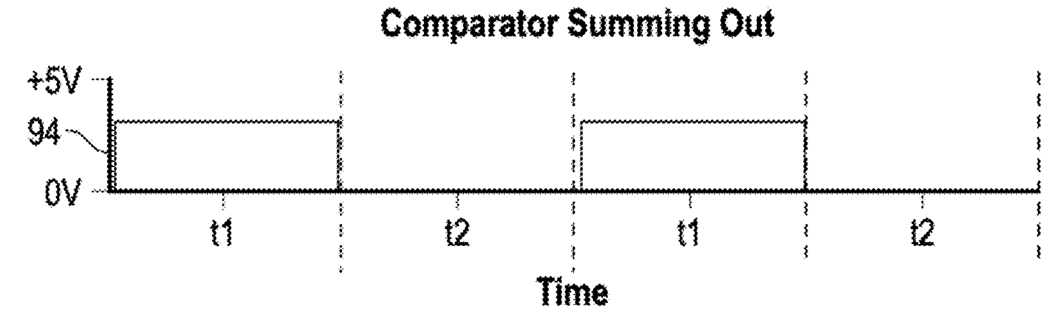
Figure 6G:
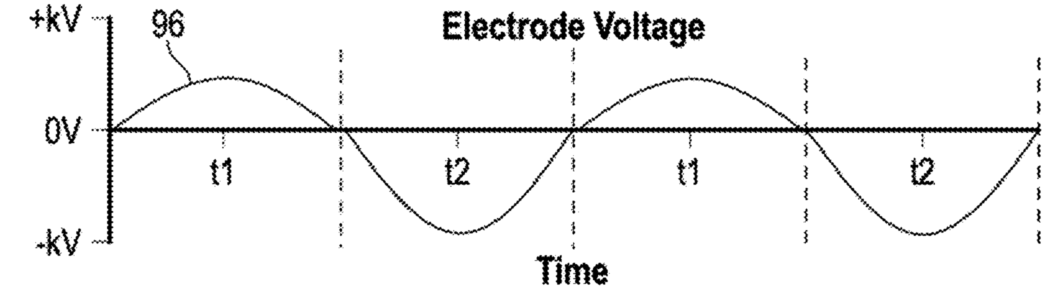

An example of the results is shown in FIGS. 6D and 6E, Positive Gain Out and Negative Gain Out signals 90 and 92 respectively. The Negative Gain Out signal 92 has been set greater in peak value than the Positive Gain Out signal 90. Both are combined serially in the Summing Amplifier 76 then to the BHVPS control input pin for full scale output voltage control 0 to +10 volts. The Gain 68 circuit output 90 is also connected to a Comparator 72 circuit. Comparator 72 will send a TTL "Hi" signal 94 to Summing Amplifier 78 when the input to Gain 68 circuit output 90 is greater than zero volts. The BHVPS will generate a positive high voltage output when the Signal Generator 60 output sine wave 84 is greater than zero volts. The Gain 70 circuit output is also connected to a Comparator 74 circuit. Comparator 74 will send a TTL "Lo" signal to Summing Amplifier 78 when the input to Gain 70 circuit output 92 is less than zero volts. Comparator 74 circuit inverts the its output before it is sent to Summing Amplifier 78. Thus, the Summing Amplifier 78 will send a TTL "Lo" signal 94 to the BHVPS. When the BHVPS receives a TTL "Lo" signal the output polarity will change to negative high voltage out. Each polarity's voltage out level remains controlled by the output signal from Summing Amplifier 76, a composite of signals 90 and 92. The composite signal in FIG. 6G represents the output of the BHVPS. Additionally, as shown in FIG. 6G, the electrode voltage 96 is shown to be a higher or greater peak negative voltage versus the peak positive voltage. The composite electrode voltage may be created by the controller input voltage to a voltage level control pin in the high voltage power supply 40. The comparator Summing voltage out in FIG. 6F shows the controller 44 inverting the polarity of the high voltage power supply 40 output or Electrode Voltage shown in FIG. 6G.

FIG. 7 shows a chart 200 titled Percent Difference Comparison Between +E and −E Fields, Romaine Lettuce Ionomic Foliar Tissue Analysis. The plot shows the results of two separate experiments; one simultaneously grew two groups of Romaine lettuce, one under a null or zero electric field and the second under a positive electric field. The two groups were separated by a grounds metal shield and each group had its own regulated light source. The second experiment also two groups of Romaine lettuce, one under a null or zero electric field and the second under a negative electric field. The two groups were separated by an earth grounded metal shield and each group had its own regulated light source. Each group was started from seed in peat substrates under the same conditions from planting to harvest, 42 days. Each group for each experiment were provided identical liquid nutrient solutions of the same volume and from the same pre-prepared source mixture during the experiment.

Metal screens coated with several layers of epoxy paint were hung above the plants, one electrically connected to earth ground and above the null field plant group and the second electrically connected to the high voltage output of the Hypotronics 10B power supply and above the electric field group of plants. All plants were set upon stainless steel pans which were electrically connected to earth ground. A distance of approximately 5 cm was maintained between the plants and their respective screens throughout the experiment. The return side of the HVPS power supply is also electrically connected to earth ground.

The electric field mean value of plus polarity experiment was +800 volts/cm with a superimposed sine wave with a peak value of +960 volts/cm and a minimum value of +640 volts/cm. Alternately, the electric field mean value of negative polarity experiment was −800 volts/cm with a superimposed sine wave with a peak value of −960 volts/cm and a minimum value of −640 volts/cm. All voltages are with respect to earth ground. The period of the superimposed sine wave was 2.0 hours for both experiments. The high voltage power supply, HVPS, was a Hypotronics Model 10B, 10 kilovolts, 5 milliamp unit. Its output polarity was physically changed for each of the two experiments. The HVPS was regulated by a 120 VAC, 60 Hz phase controller supplying electrical power to the HVPS. The phase controller was in turn driven by a Function/Arbitrary Waveform Generator, Model DG2052, manufactured by Rigol Technologies.

The chart 200, FIG. 7, shows each of the two experiments as a comparison of the percent difference of each element concentration between the electric field group with its companion null electric field group. The positive electric field group shown as the open area columns are side by side with the negative electric field group shown as solid black columns. For example, the concentration of the element iron, Fe, for the negative electric field group is approximately 75 percent greater than the null electric field group grown simultaneously with the negative electric field group of Romaine lettuce. The concentration of iron for the positive electric field group is approximately 50 percent less in concentration than the null electric field group grown simultaneously with the positive electric field group of Romaine lettuce. The negative electric field experiment shows all nutrient elements increased in concentration as compared to the positive electric field group. Aluminum is toxic and not considered a nutrient for either plants or humans, but was tested to determine its concentration for general knowledge. Aluminum's increase in concentration points to the need to know the stoichiometry of any nutrient solution and plant substrate material (if used) in a controlled environment agriculture operation. Open field agriculture always encounters toxic elements in soil, but its concentration is measured and compared to prescribed concentration limits allowed in human food or animal fodder.

Control of the electro-biofortification electric fields can be accomplished by computer program, arbitrary waveform generators, dedicated analog/digital circuits, or simple manually set electrical control. The combinations of high voltage generated field intensity, polarity, symmetrical or non-symmetrical voltage waveforms, and timing parameters are almost infinite, can be controlled by the requirements of the plant grower to meet nutritional and yield and marketability goals by incorporating electro-biofortification method and system strategies into farming practices.

FIG. 8 shows a table 300 corresponding to elemental analysis report data for a lettuce experiment, labelled LETTUCE 5 where a control group of lettuce plants was grown under zero electric field conditions and a second lettuce group was grown under slowly varying negative electric field conditions. The period of the varying negative electric field was about two hours. Accordingly, it will be appreciated that the voltage output from the high voltage power supply 40 may be understood as generating the electric field for a predetermined period of time based upon ionomic concentrations of the vascular plant. In the example of FIG. 8, those levels were such that the period was determined to be about two hours.

The average voltage gradient between the charged screen above the negative electric field lettuce group was approximately −1,200 volts per centimeter, distance between the top of the lettuce leaves and the electrically charged epoxy coated metal wire screen. The screen openings were square and measured ¼ inch by ¼ inch or 6.3 mm by 6.3 mm. The lights were on for 16 hours and off 8 hours each daily cycle during the plant growth period.

The experimental subject corresponding to FIG. 8 was romaine lettuce, *Lactuca sativa*, thurinus MTO OG-Pellet, seed from Johnny's selected seeds, 955 Benton Avenue, Winslow, Maine 04901. The lettuce leaves were harvested after 30 days of growth. The leaves were weighed immediately after harvest, minced and dried until no further weight change over hours at 190 degrees Fahrenheit. Two separate lettuce groups grown simultaneously in a chamber with controlled equalized lighting. One group of six plants on each side of the chamber with a grounded solid vertical metal screen separating the two groups of lettuce plants. A metal screen hung above each group of plants. One screen was continuously grounded to earth ground and the second screen hung above the second group of lettuce plants and was electrically connected to the controlled high voltage power supply. Both screens were coated with two layers of epoxy enamel white paint for insulation to prevent ionization of surrounding air. Each lettuce plant grew in its own peat pellet. The peat pellets sat on stainless steel trays. Each tray was electrically connected to earth ground. The grounded screen side was on one side of the vertical metal grounded screen and the negative electric field group of lettuce plants were on the opposite side of the vertical metal grounded screen. Both groups were illuminated equally. A small exhaust fan was continuously operating in the ceiling of the chamber's overhead. Each lettuce group received equal amounts of liquid nutrient and water, distilled, alternately. In one example, they received commercially distilled water and powdered plant nutrient (e.g., Miracle grow and optionally other supplemental chemicals) in order to create a supply of liquid nutrient. As the plants grew, both experimental plant groups received equal measured volumes of liquid nutrient from the same supply source.

Accordingly, it will be appreciated that the disclosed method provides for a method for optimizing an ionomic content of a vascular plant (e.g., the vascular plants 12,38 depicted in FIGS. 1, 2A, 3, and 4). In one example, the method includes providing an electrode (e.g., the electrodes 6 depicted in FIGS. 1, 2B, 3B, 4B) and an insulator (e.g., insulator 4 depicted in FIGS. 1, 2B, 3B, as well as tube 50 in FIGS. 4A and 4B). The insulator 4 (e.g., and also the tube 50) is preferably located on the electrode 6 in order to prevent the creation of an ion wind around the electrode 6. The method may further include electrically connecting the electrode 6 to a voltage power supply 40, providing an electrical pathway from a return side of the voltage power supply 40 to roots of the vascular plant. The electrical pathway may include a substrate 22 located between the roots 24 (FIG. 1) and the electrode 6. Finally, the method may include charging the electrode 6 to a voltage via a varying voltage output of the voltage power supply 40, thereby generating an electric field 7 emanating from the electrode 6, and terminating the electric field 7 on surfaces (e.g., adaxial and abaxial surfaces) of leaves 16 of the vascular plant 12,38 for optimizing the ionomic content such that mineral cations are taken up by the vascular plant 12,38 from nutrients in the substrate 22 and into symplastic material of the leaves.

Terminating the electrical field 7 on adaxial and abaxial surfaces of leaves 16 of the vascular plant 12,38 for optimizing the ionomic content is preferably configured such that multivalent mineral cations are taken up by the vascular plant 12,38. In one example, the abaxial surface of the leaves 16 may be a terminating surface on a windy day, but not a normal event. The electric field 7 may not bend around to terminate on the side of a leaf which is not somewhat normal to the electrode 6. Additionally or alternatively, terminating the electric field 7 may be configured such that single valent mineral cations are taken up by the vascular plant 12,38.

Furthermore, in one example the electric field 7 terminating on adaxial and abaxial surfaces of the leaves 16 of the vascular plant 12,38 is greater than one volt per centimeter. It will also be appreciated that the voltage output from the high voltage power supply 40 may be negative with respect to earth ground or negative with respect to earth ground with periodic momentary reversals of polarity.

In order to control the electrical field, the method may further include electrically connecting a controller 44 to the voltage power supply 40. The controller 44 may be configured to control at least one of: a) a cycle period associated with a strength of the electric field 7, b) a voltage per unit length of the electric field 7, and c) an output voltage polarity of the electric field 7. Additionally, it will also be appreciated that the disclosed method includes a mechanism to "pump" the vascular plant 12,38 and further optimize the ionomic content. Specifically, the method may optionally include a step of actively superimposing (e.g., writing) a dither waveform onto a signal of the voltage via the controller 44 in order to vary a level of the voltage, thus varying the electric field 7. In a preferred embodiment, the dither waveform may be provided with a frequency higher than a frequency of a signal of a voltage of the high voltage power supply 40. The function of the dither waveform may be understood as follows. Preferably, the frequency of the dither waveform and a voltage strength of the dither waveform may be together configured to break bonds of mineral cations adsorbed in and/or located at an electric double layer defining symplastic material of the vascular plant 12,38, thus increasing an overall concentration of cations in said symplastic material. Stated differently, the dither signal is preferably configured to agitate cations adsorbed vice adsorbed to the electric double layer apoplastic surfaces of the leaves 16.

This may be understood as allowing the vascular plant 12,38 to maintain an ionic balance within the symplastic material. Stated differently, the dither signal may be configured to imbalance the bulk cytoplasmic, symplastic, material in a cell in order for the plants 12, 38 to rebalance the cytoplasm, by storing excess cations in vesicles such as vacuoles and trichomes, inter alia, thus increasing the ionomic concentration in the plant. This may be considered to constitute a pumping action configured to increase nutrient content in the plants 12, 38, affect color in flowers, support agromining operations, and/or load plant seeds with sufficient nutrients for future success as seedlings and mature plants.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

With regard to the methods described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A bioelectric method for optimizing an ionomic content of a vascular plant, the method comprising:

providing an electrode and an insulator that conformally coats the electrode in order to prevent creation of an ion wind around said electrode, the electrode being disposed above the vascular plant, maintained a distance therefrom, and separated from the vascular plant by an air gap;

electrically connecting said electrode to a voltage power supply;

providing an electrical pathway from a return side of said voltage power supply to roots of said vascular plant, said electrical pathway comprising a substrate disposed between said roots and said electrode;

charging said electrode to a voltage via a varying voltage output of said voltage power supply, thereby generating an electric field emanating from said electrode; and terminating said electric field on surfaces of leaves of said vascular plant for optimizing the ionomic content such that mineral cations are taken up by said vascular plant from nutrients in said substrate and into symplastic material of said leaves.

2. The method according to claim 1, further comprising electrically connecting a controller to said voltage power supply, said controller configured to control at least one of: a) a cycle period associated with a strength of said electric field, b) a voltage per unit length of said electric field, and c) an output voltage polarity of said electric field.

3. The method according to claim 2, further comprising controlling the voltage power supply via the controller to actively superimpose a dither waveform onto a signal of said voltage in order to vary a level of said voltage, thus varying said electric field.

4. The method according to claim 3, wherein the controller controls said voltage output to generate said electric field for a predetermined period of time based upon ionomic concentrations of said vascular plant.

5. The method according to claim 4, wherein the controller controls said voltage output to said electrode to be negative with respect to earth ground.

6. The method according to claim 4, wherein the controller controls said voltage output to said electrode to be negative with respect to earth ground with periodic momentary reversals of polarity.

7. The method according to claim 2, wherein the controller controls said voltage output to be an oscillating voltage output.

8. The method according to claim 1, wherein terminating said electric field on surfaces includes terminating said electric field on at least one of adaxial and abaxial surfaces of leaves of said vascular plant for optimizing the ionomic content such that multivalent mineral cations are taken up by said vascular plant.

9. The method according to claim 1, wherein terminating said electric field on surfaces includes terminating said electric field on at least one of adaxial and abaxial surfaces of leaves of said vascular plant for optimizing the ionomic content such that single valent mineral cations are taken up by said vascular plant.

10. The method according to claim 1, wherein said electrode comprises a metallic screen disposed between a source of light and said vascular plant, said source of light being either a sun or an artificial source of light.

11. The method according to claim 1, wherein said voltage power supply is a high-voltage power supply having four-quadrant sink-and-source capability.

12. The method according to claim 1, wherein said electric field terminating on adaxial and abaxial surfaces of said leaves of said vascular plant is greater than one volt per centimeter.

13. The method of claim 1, wherein the electric field is a non-ionizing electric field.

14. The method of claim 13, wherein the electric field is a static or quasi-static non-ionizing electric field.

15. The method of claim 1, wherein said electrical pathway comprises a metallic tray electrically connected to the return side of said voltage power supply and to earth ground, and a liquid nutrient in said tray in contact with the roots.

16. The method of claim 1, wherein the insulator encapsulates the electrode so that no electrically conductive surface of the electrode is exposed to air.

17. The method of claim 1, further comprising controlling a strength of the electric field by adjusting a distance between the insulator and the vascular plant while holding the voltage substantially constant, or by adjusting the voltage while holding that distance substantially constant.

18. The method of claim 1, wherein a strength of the electric field between the insulator and the vascular plant is from 1.0 to 2,000 volts per centimeter.

19. The method of claim 1, wherein the electrode comprises a metallic screen and the insulator comprises an epoxy enamel coating on the screen.

20. The method of claim 19, wherein the metallic screen is disposed above the vascular plant, between a source of light and the vascular plant, and extends beyond an array of the vascular plant by at least a width of one fully grown plant row.

* * * * *